(12) United States Patent
Stankowski et al.

(10) Patent No.: US 7,083,824 B2
(45) Date of Patent: Aug. 1, 2006

(54) METHOD OF PROTECTING A LOCAL AREA OF A COMPONENT

(75) Inventors: Alexander Stankowski, Neuenhof (CH); Andreas Boegli, Wettingen (CH); John Fernihough, Ennetbaden (CH)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/631,846

(22) Filed: Aug. 1, 2003

(65) Prior Publication Data

US 2005/0100672 A1    May 12, 2005

(30) Foreign Application Priority Data

Aug. 2, 2002   (EP)   ................... 02405673

(51) Int. Cl.
 *B05D 1/32*    (2006.01)
 *B05D 1/38*    (2006.01)

(52) U.S. Cl. ............ 427/142; 427/8; 427/595; 427/156; 427/239; 427/272; 427/275; 427/282; 427/287; 427/289; 427/409; 427/419.3

(58) Field of Classification Search ........... 427/282, 427/8, 595, 272, 275, 287, 239, 289, 156, 427/142, 409, 419.3
See application file for complete search history.

(56) References Cited

U.S. PATENT DOCUMENTS

| | | | |
|---|---|---|---|
| 4,726,104 A * | 2/1988 | Foster et al. ............... 29/889.1 |
| 4,743,462 A | 5/1988 | Radzavich et al. |
| 5,167,721 A | 12/1992 | McComas et al. |
| 5,318,091 A | 6/1994 | Pavoni et al. |
| 5,540,880 A * | 7/1996 | Horiki et al. ............... 264/553 |
| 5,614,054 A | 3/1997 | Reeves et al. |
| 5,728,227 A | 3/1998 | Reverman |
| 5,851,409 A | 12/1998 | Schaeffer et al. |
| 5,900,102 A | 5/1999 | Reeves |
| 5,902,647 A * | 5/1999 | Venkataramani et al. ... 427/454 |
| 6,107,598 A * | 8/2000 | Updegrove et al. ...... 219/121.7 |
| 6,132,520 A | 10/2000 | Schilbe et al. |
| 6,158,957 A | 12/2000 | Marcin et al. |
| 6,165,345 A | 12/2000 | Updegrove et al. |
| 6,174,448 B1 | 1/2001 | Das et al. |
| 6,193,762 B1 | 2/2001 | Wagner et al. |
| 6,210,488 B1 | 4/2001 | Bruce |
| 6,265,022 B1 | 7/2001 | Fernihough et al. |
| 6,376,800 B1 | 4/2002 | Updegrove et al. |
| 2001/0009247 A1 | 7/2001 | Brooks |
| 2004/0191460 A1* | 9/2004 | Hoelger ....................... 428/43 |

FOREIGN PATENT DOCUMENTS

| | | |
|---|---|---|
| EP | 0854005 A2 * | 7/1998 |
| EP | 0861919 A2 | 9/1998 |
| EP | 1076106 A1 | 2/2001 |

* cited by examiner

*Primary Examiner*—Kirsten Jolley
(74) *Attorney, Agent, or Firm*—Buchanan Ingersoll PC (57) ABSTRACT

It is disclosed a method of protecting a local area of components (1) from the effects of thermochemical or mechanical processes carried out on the surface (6) of the component. A masking material (5) containing at least one filler material is applied to the local area so that the local area is protected by the masking material (5). This is at least partially polymerized on the local area. Subsequently the thermochemical or physical processes on the surface (6) of the component (1) are carried out after which the polymerized masking material (5) is removed from the local area of the component (1).

33 Claims, 4 Drawing Sheets

METHOD OF PROTECTING A LOCAL AREA OF A COMPONENT

FIELD OF THE INVENTION

The invention relates to a method of protecting a local area of a component from the effects of thermochemical or mechanical processes carried out on the surface of component.

BACKGROUND OF THE INVENTION

Components such as gas turbine blades, vanes and other cooled parts often contain cavities that distribute cooling air to a plurality of holes in the wall of the part that lead to the outer surface. Most turbine components are coated for protection from oxidation and/or corrosion with, for example, a metallic coating such as MCrAlY or a diffusion coating and some are also coated with a thermal barrier coating (TBC) for thermal insulation. The demands of operation of the parts in a gas turbine often lead to the degradation and consumption of the coating before the structural integrity of the underlying part itself is degraded. Hence, the metallic and ceramic coating must be removed and reapplied at least once during the lifetime of the component.

Thermochemical and physical processing of blades after initial manufacturing can be very problematic for parts with a large number of cooling holes. During original part manufacture, the coatings are usually applied first and then the holes are drilled directly through the coating and the wall thickness of the component. However, the holes are already in place during the repair operations, such as acid or alkaline chemical stripping, used to remove old coatings, or grit blasting, water-jet stripping, high speed grinding abrasive techniques and, high speed milling. As an example, U.S. Pat. No. 5,167,721 discloses a method of removing a plasma sprayed and sintered coating by liquid jet. A method of electrochemical stripping of turbine blades is disclosed in U.S. Pat. No. 6,165,345. Another method of removing an environmental coating on a metallic substrate is known from U.S. Pat. No. 5,851,409. The coating containing cracks is subjected to an acidic solution that penetrates the cracks and interacts with the diffusion zone so as to chemically strip the diffusion coating from the substrate. U.S. Pat. No. 6,174,448 discloses a method of removing a diffusion aluminide coating of a component. This method removes the coating by stripping aluminium from the coating without causing excessive attack, alloy depletion and gross thinning of the underlying superalloy substrate. Similar methods are known from U.S. Pat. No. 5,728,227 or EP-A2-861 919. Methods of removing a thermal barrier coating are known, e.g. from the documents U.S. Pat. No. 6,158,957, U.S. Pat. No. 6,132,520, U.S. Pat. No. 5,900,102, US-A1-2001/0009247, U.S. Pat. No. 6,210,488, U.S. Pat. No. 5,614,054.

Unfortunately, during processing the chemical agents that are applied to remove the coating also react to a certain extent with the base material or the recast zone of laser drilled cooling holes, resulting in dimensional changes—in particular widening of the holes. The change in shape or diameters of the holes brought about during processing can have a significant influence on the effectiveness of the cooling holes, especially considering that some holes are 1 mm or less in diameter. Specially shaped cooling holes are particularly susceptible to this as their effectiveness depends heavily on the accuracy of the shape of the hole. This problem is particularly great for the most modern components which contain hundreds of cooling holes and are designed to operate within very tight tolerance bandwidths—the upper limit on cooling hole diameter to stop the waste of unneeded cooling air which drastically reduces engine efficiency and power output and the lower limit on cooling hole diameter to prevent overheating of the component, which would lead to its premature failure in service. Chemical etching/stripping methods can lead to an attack of the surface layer of the cooling holes, leaving oversized holes that flow outside of the originally intended specification. Grit blasting and other physical processes involving grinding can erode away the edges and surface contour of the cooling holes at the upper surface of the component, again bringing the air flow to outside specified limits.

There have been several disclosures relating to this problem and there are several widely known practices. Those skilled in the art are aware that a common practice is to fill the holes with a suitable material such as plastic or wax. However the wear, thermal and chemical resistance of this material is often insufficient to maintain a desired level of filling in the cooling holes during preparation steps while processing which often involves surface grit blasting to clean the outer surface of the component. Due to its lack of wear resistance, the plastic or wax readily is eroded away by the grit blasting. Commonly used plastics are easily infiltrated by the strong acid solutions leading to their spallation and subsequent attack of the no longer protected base material.

SUMMARY OF THE INVENTION

It is an object of the present invention to find a cheaper, easier and faster method to provide greater wear, thermal and chemical resistance to a masking material so that it remains in sufficient quantity on parts of a component to protect the covered areas during various thermochemical or physical processes to be carried out. It is another object of the invention to find a method of adequately protecting all holes of a component from being dimensionally affected beyond a desired limit with the thermochemical or physical process carried out on the component. This invention is particularly suited to prevent the changing beyond desired limits of the cooling holes in gas turbine blades and stator vanes with a chemical stripping method designed to remove ex-service coatings.

According to the invention a process was found of protecting local areas of a gas turbine component with an external surface, before a thermochemical or mechanical process is carried out on the surface of the component, method comprising the steps of applying a masking material to the local area so that the local area is protected by the masking material, said masking material containing at least one filler material, at least partially thickening the masking material, carrying out the thermochemical or physical removal process for the removal of material from the surface of the component and removing the thickened masking material from the local area of the component.

The invention departs from the state of the art by the addition of a hard filler material to the masking material used to protect any part of a component such as braze joint, local parts of a coated area, such as a platform of a gas turbine blade or a coated area on top of a braze joint as well as other sensitive areas (e.g. impingement plate etc.) or cooling holes from being affected. The filler material imparts a surprising and unexpected resistance to physical erosion during grit blasting and as a result, the masking material is much more advantageous than the state of the art in its effectiveness in protecting the cooling holes. The chemical or physical (i.e. mechanical) process however could as well be one of a chemical etching method, acid or alkaline stripping, water jet stripping, grit blasting, high speed grit blasting or another abrasive technique.

According to this invention the polymer masking material, when it contained an appropriate filler, could be filled into the cooling holes only up to the exterior surface of the component and still adequately protect the cooling holes from being affected by thermochemical and physical processes. The filler material is selected from particles or fibres of metal, oxide material such as silica, magnesia, calcia, alumina, zirconia, yttria or a mixture there of, which provided adequate wear and thermal resistance in the range of 10 to 90 vol.-% and in a preferred range of 20–60 vol.-%. A range of filler particle sizes is effective in improving wear resistance and thermal resistance of the masking material. Particle sizes from 1 µm average diameter to over 500 µm diameter are possible. However the average particle size from 10 µm to 150 µm, with a preferred range of 40 to 100 µm showed superior improvements to the thermochemical or mechanical resistance and general handling of the masking material compared to a general size range. Metallic fillers, other oxide fillers or organic materials mixtures are also possible.

The masking material can be applied to the cooling holes from the external surface which consumes far less of the polymer compared to any of the prior art using such masking materials in which either the entire cooling configuration had to be filled with polymer, or the entire component had to be dipped in polymer. Still one embodiment is to apply the masking material from an internal cavity of the component.

The energy source used to thicken the mask material can be placed on the outside of the component so that the energy impinges directly on said masking material which plugs the cooling holes. Still it is possible that the energy source is placed into an cavity of the component.

It was found that residual polymer on the outer surface of the component would affect the efficiency of the applied thermochemical or physical process, hence the need to clean the entire surface. Thus, a substance which fluoresces under ultraviolet light was added to the masking material, which allows an inspection to locate any unwanted excess residual masking material. Inspection was performed using ultraviolet lights of the types found in normal Florescent Penetrant Inspection (FPI) booths well known to those skilled in the art. Any excess masking material on the surface of the component was removed by mechanical means in preparation for the stripping process. In one embodiment, this is achieved without interruption of the grit blasting process by integrating the UV light source into the grit blasting cell and equipping the blasting cell with windows of appropriately UV blocking glass or plastic. After removing unwanted residual masking material a re-inspection is carried out using ultraviolet light to locate any further unwanted residual masking material. It may be necessary to reapply masking material to the cooling holes, if some of the protecting masking material had been eroded away by the cleaning process of unwanted masking material.

In order to facilitate the application and/or hardening of at least a portion of the masking material the component may be heated before or during processing.

It was also found that filling the cooling holes or protecting the parts in successive stages which it is at least partially thickened before the application of the next amount in the cooling hole or on the part, and using a gradient of filling materials offered advantages. Only the layers of material at the uppermost portions of the cooling holes required significant volume fractions of solid fillers in the range of 30–80 vol.-% with a grain size of 40–150 µm to a depth not less than 1 mm to give them wear resistance against the grit blasting required to clean the entire outer surface of the component prior to the coating operation.

In a further embodiment of the current invention, for the cases where there is still masking material or filler material in the cooling holes, a water jet or an ultrasonic cleaning treatment after the burnout of the polymer could be used to remove any residue of masking material which is in the cooling holes. This step can be done manually, or by locating the cooling holes using a three dimensional vision system which directs a CNC machine using the same program to drill the cooling holes in the first place.

The masking material can be a special UV polymerizing plastic such as polyurethane, a polyurethane oligomer mixture, 2-Hydroxyl Methacrylate, Isobornyl Acrylate, Maleic acid, methyl methacrylate, butyl acrylate copolymer, acrylic acid, T-Butyl Perbenzoate, poly(isobutyl methacrylate), poly (vinyl toluene), polyproplyene or a polypropylene/polyurethane oligomer mixture, the class of polymers vetones or silicones, or any mixture thereof. It can as well be a photopolymerizing resin or a mixture of resins and photo-initiator which polymerize with exposure to ultraviolet light. The masking material may also be a substance that is not at least partially liquid but rather a powder, which means a collection of solid particles, or a slurry, which is a suspension of solid particles in a liquid.

The thickened masking material containing the filler material is heated or processed so as to volatilize or otherwise remove the volatile, un-polymerized organic portion of the masking material before the thermochemical or physical process on the surface of the component is carried out. There may be included in the resin binding agents which are effective in holding together the solid particles of metal or oxide after the organic portion of the masking material is removed so that it can withstand chemical or physical processes to be applied to the external surface.

The masking material is thickened (i.e. polymerised) by an energy source, which may be electromagnetic such as visible, ultraviolet or infrared light or collimated light such as laser.

BRIEF DESCRIPTION OF THE DRAWINGS

Preferred embodiments of the invention are illustrated in the accompanying drawings, in which.

The drawings show only the parts important for the invention. Same elements will be numbered in the same way in different drawings.

DETAILED DESCRIPTION OF THE INVENTION

Figure 1:
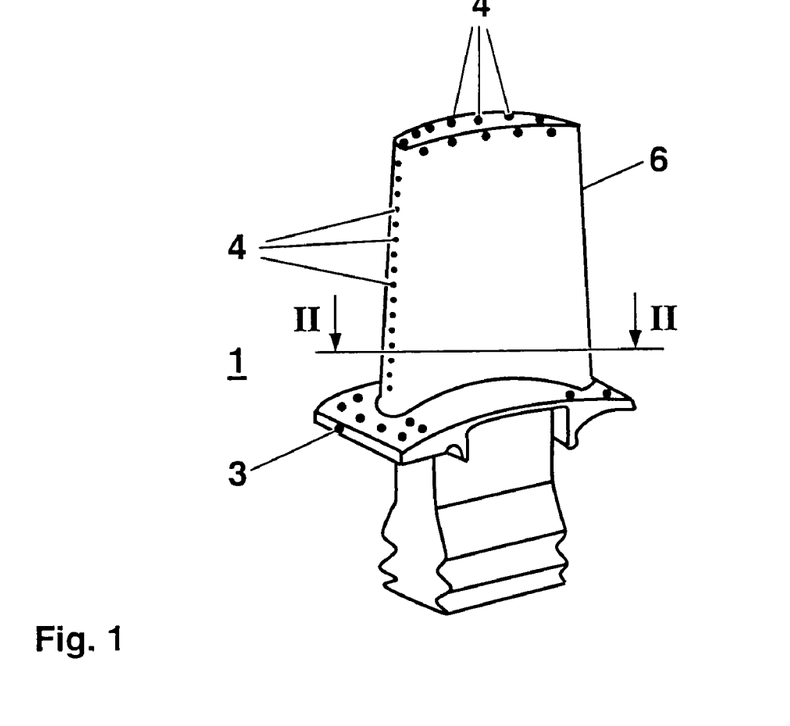
FIG. 1 shows a gas turbine blade with cooling configuration.
Figure 2:
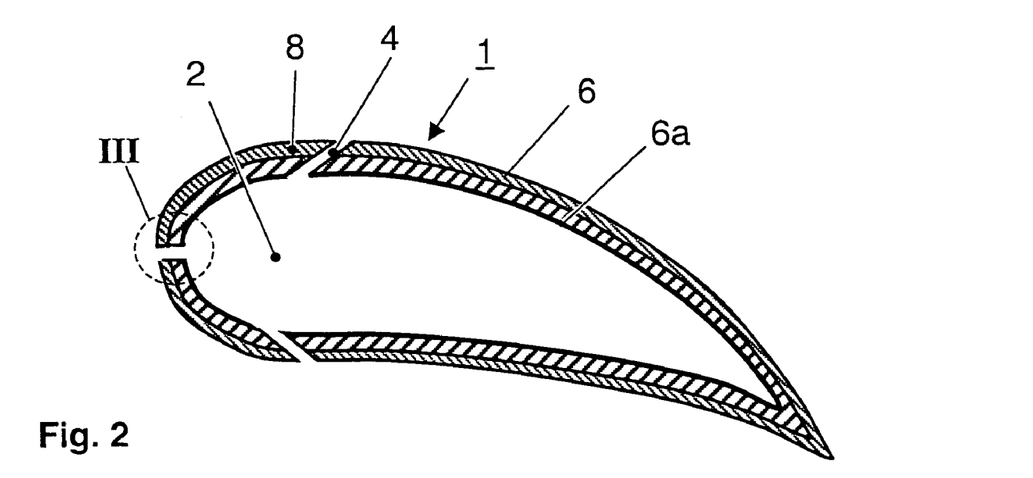
FIG. 2 shows a section by line II—II through the turbine blade shown in FIG. 1, comprising a cavity and a plurality of cooling holes

FIG. 1 shows a coated component 1 such as blades or vanes of gas turbine engines comprising a cavity 2, visible in FIG. 2, and cooling holes 4, which are on the external surface 6 of the component 1 as well as on the platform 3 of the component 1. The present invention relates to a process of masking parts of the component 1 before the application of a thermochemical or physical (i.e. mechanical) process on the external surface 6 of the component 1. The thermochemical or physical (or mechanical) process could be one or a combination of a chemical etching method, acid or alkaline stripping, water jet stripping, grit blasting, high speed grit blasting or another abrasive technique.

One embodiment would be the protection of a braze joint or local parts of a coated area, such as a platform of a gas turbine blade or a coated area on top of a braze joint as well as other sensitive areas (e.g. impingement plate etc.) during exposure to the thermochemical and/or mechanical stripping process. In another embodiment the cooling holes 4 of the gas turbine component 1 are protected from being dimensionally affected beyond a desired limit during the removal of the coating 8 from the component 1. The example in FIG. 2 and FIG. 3 refers without limitation of the present invention to the protection of the cooling holes 4 during the removal of a coating 8.

According to line II—II in the FIG. 1, FIG. 2 shows a section through the component 1. The component 1 comprising the cavity 2 and three cooling holes 4. The number of the cooling holes 4 is given only as an example and may vary on the purpose the component 1 is used for. The component 1 has an external surface 6 with a coating 8 and an internal surface 6a.

In that case the already coated component 1 will by any means (acid or alkaline stripping, water jet, high speed machining) be stripped of the coating 8 to reveal the external surface 6 of the component 1.

The steps of the process of the invention are given in FIG. 3a to 3g, which show a cooling hole 4 from the component 1 in detail as given as an example in the circle III in FIG. 2.

Figure 3A:
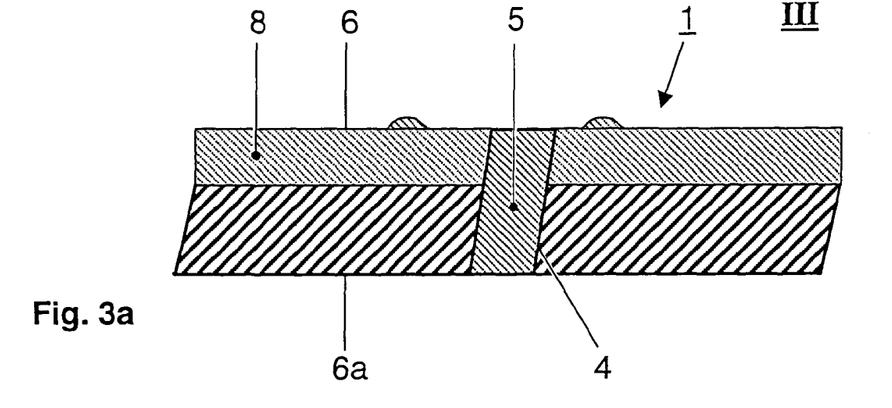
FIG. 3a–g shows the steps of the process of the invention, applying masking material to the cooling holes, thickening the masking material and removing any residual masking material of the cooling holes, shown as an example at one cooling hole according to the circle III in FIG. 2.

The FIG. 3a shows the first step of the process according to the invention. The cooling holes 4 are masked with the masking material 5. It is possible to spray or immerse the cooling holes 4 with a material which is at least partially liquid, the masking material 5, and which thickens, which means to become more viscous or solid when exposed to an energy source 7. Preferably the cooling holes are filled by injecting the masking material 5 into the cooling cavity 2 of the component 1 and force it through the cooling holes 4. Excess masking material 5 may be removed afterwards from the external and the internal surface 6, 6a (which can be the cavity 2 or one side of the platform 3 not to be coated) of the component 1 before the application of an energy source 7. As further explained below, one advantageous embodiment is to apply the masking material 5 from the external surface 6, for example by means of a spatula.

As masking material 5 different substances may be used: a organic material or a resin of a plastic such as polyurethane, a polyurethane oligomer mixture, 2-Hydroxyl Methacrylate, Isobornyl Acrylate, Maleic acid, methyl methacrylate, butyl acrylate copolymer, acrylic acid, T-Butyl Perbenzoate, poly(isobutyl methacrylate), poly(vinyl toluene), polypropylene or a polypropylene/polyurethane oligomer mixture, the class of polymers vetones or silicones, or any mixture thereof, a photopolymerizing resin or a mixture of resins and photoinitiator which polymerize with exposure to ultraviolet light, the masking material 5 may also be a substance that is not at least partially liquid but rather a powder, which means a collection of solid particles. Thickening of the powder then refers to the agglomeration and the sticking together to form clumps or a large solid mass of individual powder particles. The powder would have to be sensitive to an energy source 7, which means that the powder particles agglomerate under the influence of the energy source 7. It could be as well a slurry, which is a suspension of solid particles in a liquid.

In addition, fillers were required to impart the masking materials 5 with thermal and chemical resistance and impact resistance to remove an existing MCrAlY coating and/or TBC. One of the possible ceramic fillers tried was particles or fibres of metal, oxide material such as silica, magnesia, calcia, alumina, zirconia, yttria or a mixture there of, which provided adequate wear, thermal and chemical resistance. Metallic fillers, other oxide fillers or organic materials are also possible.

Figure 3B:
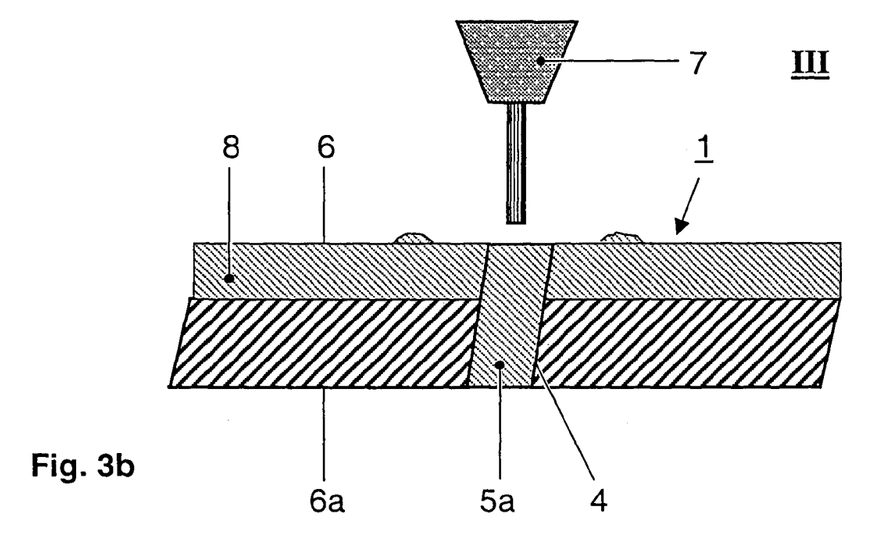

FIG. 3b shows the second step of the process according to the invention of at least partially thickening, i.e. polymerising, the masking material 5. A desired energy source 7 will be placed from the outside of the component 1 so that the energy impinges directly on said masking material 5 which is in the cooling holes 4. FIG. 3b shows the thickened material 5a as well. Still it is possible that the energy source 7 is placed into an cavity 2 of the component 1.

Different energy sources 7 may be used in order to obtain the desirable result: it can be electromagnetic such as visible light, ultraviolet light or infrared light, it can be a device providing collimated light such as a laser, the energy source 7 can also be a device providing light of a single wavelength or a distribution of wavelengths centered around a desired wavelength with a narrow distribution band. Furthermore the energy source 7 may be introduced into the cavity 2 of the component 1 via an optical fiber or the energy source 7 can be sonic vibrations ranging from infrasonic (below 20 Hz) to ultrasonic (above 20,000 Hz) frequencies. In this case the energy source can be a transducer (i.e. an ultrasonic transducer).

The masking material 5a thickened from the energy source 7 containing the filler material may further be heated so as to volatilize or otherwise remove the volatile organic portion of the thickened masking material 5a before the coating 8 is removed from the external surface 6 of the component 1. There may be included in the resin binding agents which are effective in holding together the solid particles of metal or oxide after the volatile organic portion of the masking material 5a is removed so that it can withstand chemical, physical or thermal processes to be applied to the external surface.

According to this invention the polymer masking material 5, when it contained an appropriate mixture of fillers, could be adequately protecting all holes of a component from being dimensionally affected beyond a desired limit by the thermochemical or physical processes carried out on the component. This invention is particularly suited to prevent the changing beyond desired limits of the cooling holes in gas turbine blades and stator vanes with a etching methods designed to remove consumed ex-service coatings.

In addition, the application of the polymerizing material from the external surface 6 of the component 1 prevented complications of plugging in the cooling configuration, or restricted flow through a cooling air distribution insert.

Furthermore, the addition of the polymer from the outer surface of the component via syringe or spatula consumed far less of the polymer compared to any of the prior art such as U.S. Pat. No. 6,265,022 or U.S. Pat. No. 4,743,462 using such masking materials 5 in which either the entire cooling configuration had to be filled with polymer, or the entire component 1 had to be dipped in polymer.

Figure 3C:
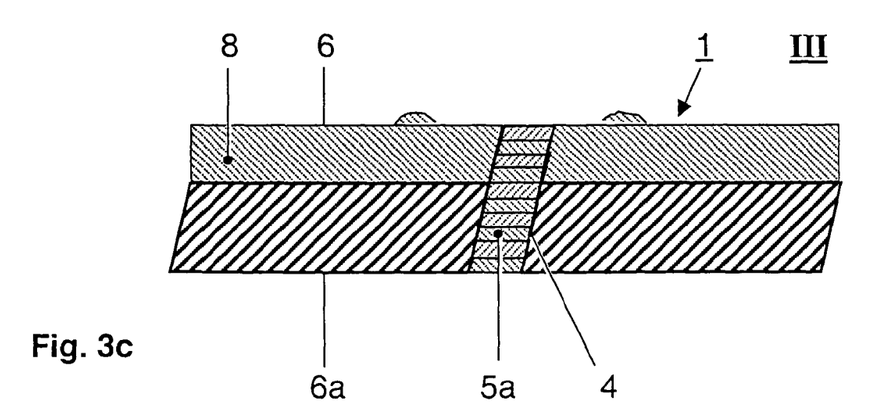

As seen in FIG. 3c it was also found that filling the cooling holes 4 in successive stages, and using a gradient of filling materials offered advantages. For example, polymerization was more rapidly carried out on pure polymer placed in the cooling holes 4 in a first layer. Only the layers of material at the uppermost portions of the cooling holes 4 required significant volume fractions of solid fillers to give them increased wear and chemical resistance against the grit blasting required to clean the entire outer surface of the component prior to the coating operation.

Figure 3D:
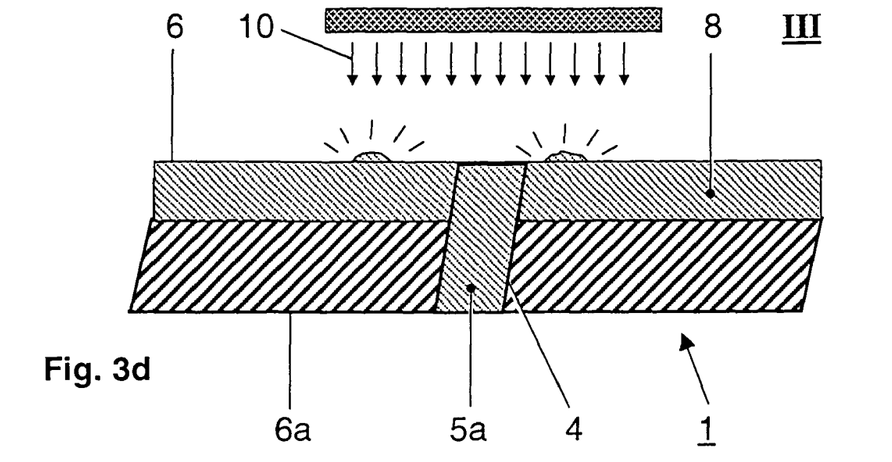

It was found that residual polymer on the outer surface 6 of the component 1 would affect the efficiency of the applied thermochemical or physical process, hence the need to clean the entire surface 6. Thus, a substance which fluoresces under ultraviolet light was added to the masking material, which allows an inspection to locate any unwanted excess residual masking material on the external surface 6. As seen in FIG. 3d, the inspection was performed using ultraviolet lights 10 of the types found in normal Florescent Penetrant Inspection (FPI) booths well known to those skilled in the art. Any excess masking on the surface 6 of the component was removed by mechanical means in preparation for the thermochemical or physical process. The FBI can be achieved without interruption of the grit blasting process by integrating the UV light source into the grit blasting cell and equipping the blasting cell with windows of appropriately UV blocking glass or plastic. If necessary, after removing unwanted residual masking material 5, a re-inspection can be carried out using ultraviolet light 10 to locate any further unwanted residual masking material 5. It may be as well be necessary to reapply masking material 5 to the cooling holes, if some of the protecting masking material had been eroded away by the cleaning process of unwanted masking material 5.

In general the filler content is in the range of 10 to 90 vol.-% and in a preferred range of 20–60 vol.-%, at least in the upper most portion of the masking material 5 in the cooling hole 4. In one embodiment the masking material 5 at the portion of the cooling hole 4 exit at the external surface 6 of the component 1 contains 30–80 vol.-% with a grain size of 40–150 µm of the filler material to a depth not less than 1 mm. In another embodiment, the cooling holes 4 are sufficiently long that they do not require complete filling, but only partial filling in a way that the upper portion closest to the external surface 6 is filled to provide the desired result. A range of filler particle sizes if effective in improving wear, chemical and thermal resistance of the masking material. Particle sizes from 1 µm average diameter to over 500 µm diameter are possible. However the average particle size from 10 µm to 150 µm, with a preferred range of 40 to 100 µm showed superior improvements to the thermal resistance, mechanical resistance and general handling of the masking material compared to a general size range.

Figure 3E:
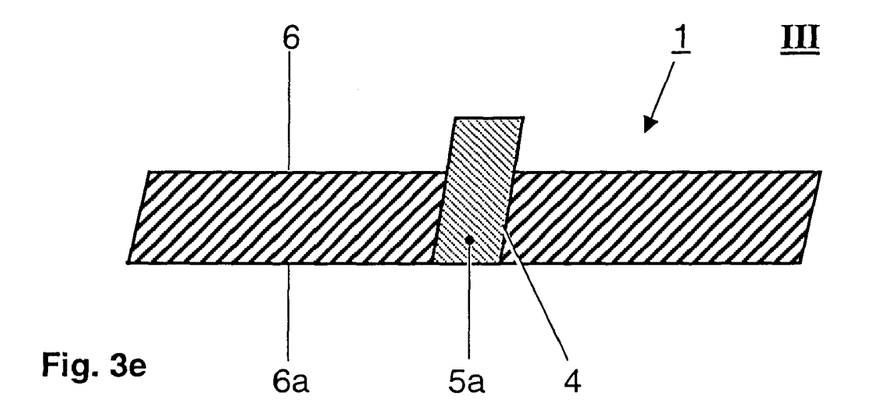

As seen in FIG. 3e and as mentioned above the removal of the coating 8 from the external surface 6 will take place with the means known in the state of the art.

Figure 3F:
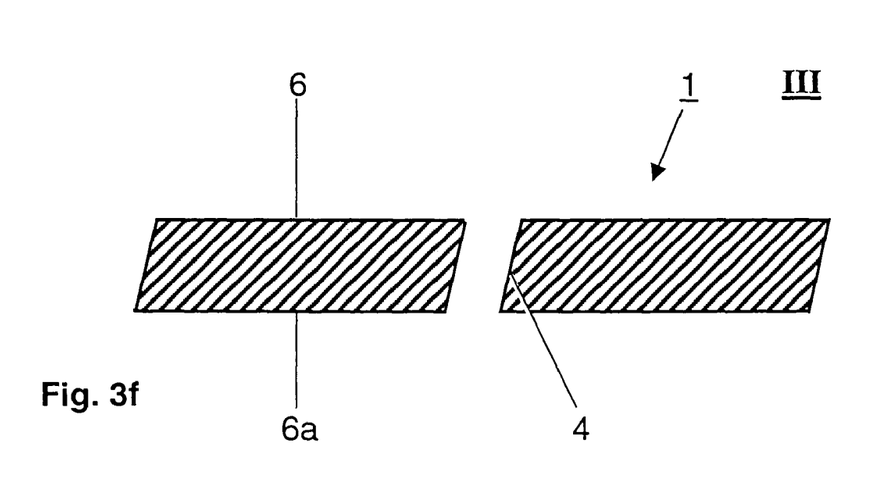

After the removal process(es) are completed, the thickened masking material 5a will be removed to reveal cooling holes 4 free of any base metal attack. This is shown in FIG. 3f. For example the removal of the thickening organic masking material 5a can be accomplished by heating the part to 600° C. in a furnace for 30 min.

Figure 3G:
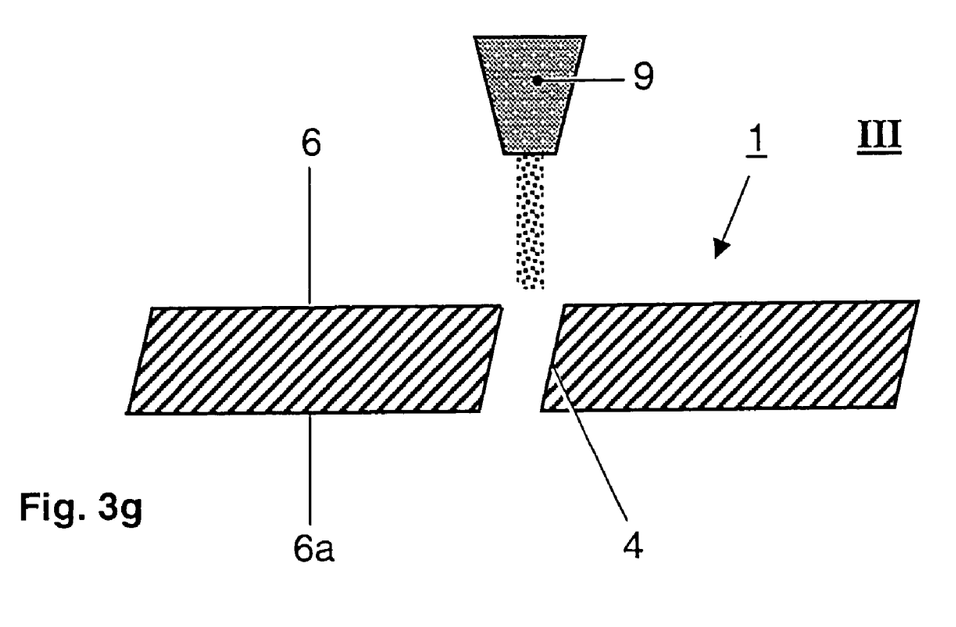

In a further embodiment of the current invention, for the cases where there is still masking material 5 or filler material in the cooling holes 4, a water jet 9 (as shown in FIG. 3g) or an ultrasonic cleaning treatment after the burnout of the polymer could be used to remove any residual masking material which is in the cooling holes 4. This step can be done manually, or by locating the cooling holes 4 using a three dimensional vision system which directs a computer numerically controlled machine using the same program to drill the cooling holes 4 in the first place.

The component 1 may be heated before or during processing to facilitate the application and/or hardening of at least a portion of the masking material 5.

EXAMPLE OF THE INVENTION

Some of the features and advantages of the present invention are demonstrated by the following two examples.

Example 1

In the first example, the cooling holes of a coated, gas turbine engine air cooled turbine nozzle article were protected from the influence of the chemically highly reactive baths and mechanical influences occurring during stripping processes of the coating.

To fulfil this purpose an appropriate masking substance was prepared by mixing suitable amounts of an adequate inorganic filler material to an UV-polymerizing agent. Thorough and controlled mixing ensured the preparation of a slurry excluding bubble formation and exhibiting the optimum viscosity required for this special kind of application. The blend contained 50% $Al_2O_3$-filler with a grain size of 80 µm and 50% resin. The preferential ranges for the constitution of the mixture are 20–60% of $Al_2O_3$-filler with a grain size in the range of 40–100 µm and correspondingly 80–40% of polymerizing resin. The blend was subsequently filled into a cartridge of a suitable application system, such as a high precision controlled pneumatic syringe. The slurry was then applied manually into the cooling holes of the gas turbine component ensuring a filling of the cooling structures to a depth range of 5–10 mm. In order to cover a wider area in one step a spatula was employed. After partial or complete filling of the component's cooling holes it was exposed to the UV-curing treatment. This was accomplished by exposing the component to a UV light in a closed cell running a semi automatically working process. Another effective means performed was to cure the resin in a manual process employing a focused UV-light. The next process step after curing was the chemical stripping. Therefore the coated component was immersed into the highly reactive, chemical strip baths at elevated temperature. The masking substance endured these conditions including intermediate mechanical and chemical surface activation treatments without suffering any damage. After accomplishment of the stripping process, the component's cooling holes remained unaffected and still covered with the protective masking material. Intermediate visual controls of masked locations enabled an easy detection of damage to the masking protection. Such locations had to be recovered with masking agent before re-exposing the component to the chemical stripping baths. In order to check the extent of coating removal achieved during stripping, the component was exposed to a Heat Tint Test. This check has been carried out under elevated temperatures in an atmospheric furnace. It lead to a complete burning off of the organic portion of the masking agent as a beneficial side effect. In the case where an Etch Test has been carried out instead of the described Heat Tint Test, the burning off of the masking material was carried out in a separate process step. This was performed preferentially in an atmospheric furnace at 600° C. for a duration of 30 min. Tenacious residues of the inorganic filler material were removed by exposing the component to an ultrasonic cleaning treatment in a water based solution containing special ingredients which further sustained the complete removal of any residues which blocked the cooling hole structure. A final flow measurement test was then carried out to check the flow characteristics of the stripped component ensuring a complete removal of the masking material.

Example 2

Another use of the described, mechanically reinforced chemically and thermally highly resistant masking material includes the following steps:

To fulfil this purpose an appropriate masking substance was prepared by mixing suitable amounts of an adequate inorganic filler material to an UV-polymerizing agent. Thorough and controlled mixing ensured the preparation of a corresponding slurry excluding bubble formation and exhibiting the optimum viscosity required for this special kind of application. The blend contained 60% of $Al_2O_3$-filler with a grain size of 100 µm and 40% of resin. The preferential ranges for the constitution of the mixture are 30–75% of $Al_2O_3$-filler with a grain size in the range of 50–120 µm and correspondingly 70–25% of polymerizing resin. The blend was subsequently filled into a cartridge of a suited application system such as a high precision controlled pneumatic syringe. The slurry was applied manually onto acid sensitive structures such as brazed joints or coated areas which should not be stripped. The thickness of such masking applications is in a range of 3–5 mm. The extent of areas which can be masked is unlimited. After the covering of the area of the components not to be stripped it was exposed to the UV-curing treatment. This was accomplished by exposing the component to a UV light in a closed cell running a semi automatically working process. Another effective means performed was to cure the resin in a manual process employing a focussed UV-light. The next process step after curing was the chemical stripping. Therefore the component was immersed into the highly reactive, chemical strip baths at elevated temperatures. The masking substance had to withstand these conditions including intermediate mechanical and chemical surface activation treatments without suffering damage. After accomplishment of the stripping process, the masked area of the component remained unaffected and still covered with the protective masking material. Intermediate visual controls of masked locations enabled an easy detection of impaired locations of masking protection. Such sites had to be recovered with masking agent before re-exposing the component to the chemical stripping baths.

In order to check the extent of coating removal achieved during stripping, the component was exposed to a Heat Tint Test. This check was carried out under elevated temperatures in an atmospheric furnace. It lead to a complete burning off of the organic portion of the masking agent as a beneficial side effect. Originally coated and masked areas have also not been attacked and were therefore still coated in its original thickness. Where an Etch Test was carried out instead of the described Heat Tint Test, the burning off of the masking material had to be carried out in a separate following process step. This was preferentially performed in an atmospheric furnace at 600° C. for a duration of 30 min. Tenacious residues of the inorganic filler material have been removed by exposing the component to an ultrasonic cleaning treatment in a water based solution containing special ingredients which further sustained the complete removal of any residues which blocked the cooling hole structure. An additional low pressure shot peening procedure was used to remove very tenacious masking residues from braze joints or protected coating areas. A final visual check of the protected braze structures has been performed. Well protected and therefore unaffected braze joints were brightly shining without exhibiting any porosity after ultrasonic cleaning and shot peening. Masked coating areas also remained unaffected beyond the masking material. They showed the typical discoloration after performing a Heat Tint Test.

Thus, the present approach provides as key objective an advancement in the protection of superalloy substrates and more particularly Ni- and Co-based superalloy substrates by masking acid sensitive areas, coating areas as well as sensitive substrate features with high demand in respect to tolerances.

Although the present invention has been described in connection with specific examples and embodiments, it will be understood by those skilled in the processes involved, that the present invention can be further modified without departing from its intention represented by the claims.

The invention claimed is:

1. A method of protecting a local area of a gas turbine component from the effect of a thermochemical or mechanical processes carried out on a surface of the component, the method comprising the steps of:
    applying a masking material to a local area or to local areas on the gas turbine component in two or more layers, such that the uppermost layer or uppermost layers of the masking material contains the highest volume fraction of at least one filler material;
    at least partially thickening at least one of the layers of the masking material before applying the next layer of the masking material;
    carrying the thermochemical process or a mechanical process, and
    removing a portion of the masking material from the local area or the local areas by heating the masking material and removing the filler material from the local area or the local areas by a separate step.

2. The method according to claim 1, wherein the local area to be protected is a braze joint, a cooling hole, or a local part of a coated area.

3. The method according to claim 1, wherein the masking material is applied from an external surface or from an internal cavity of the component.

4. The method according to claim 1, wherein the masking material is thickened by the use of an energy source, whereby energy impinges from the outside or from an internal cavity of the component.

5. The method according to claim 1, wherein after applying the masking material the surface of the component is cleaned by mechanical means to remove any unwanted residual masking material.

6. The method according to claim 1, wherein the masking material contains a substance that fluoresces under ultraviolet light, and after removing the masking material, an inspection is carried out using ultraviolet light to locate unwanted residual masking material and the unwanted residual masking material is mechanically removed from the surface.

7. The method according to claim 1, wherein after removing unwanted residual masking material, masking material is reapplied to the local area.

8. The method according to claim 1, wherein the thermochemical or mechanical process is one or a combination of a chemical etching method, acid or alkaline stripping, water jet stripping, grit blasting, high speed grit blasting or another abrasive technique.

9. The method according to claim 1, wherein the component is heated before or during the method to facilitate the application and/or thickening of at least a portion of the masking material.

10. The method of claim 1, wherein the amount of filler is changed from layer to layer of masking material.

11. The method of claim 10, wherein the masking material of the uppermost layer or uppermost layers contains 30–80 vol.-% filler material with a grain size of 40–150 µm to a depth not less than 1 mm.

12. The method according to claim 1, wherein the fillers added to the masking material include particles or fibres of metal, oxide material or organic materials.

13. The method of claim 12, wherein the filler material content of the uppermost layer or uppermost layers of the masking material is in the range of 10–90 vol.-%.

14. The method of claim 13, wherein the filler material content of the uppermost layer or uppermost layers of the masking material is in the range of 20–60 vol.-%.

15. The method according to claim 1, wherein the filler material particle diameter size is on average, or contains mixtures with average diameters, ranging from 1 µm to 500 µm.

16. The method according to claim 1, wherein the filler material particle diameter size is on average, or contains mixtures with average diameters, ranging from 40 µm to 100 µm.

17. The method according to claim 1, wherein the thickened masking material is removed from the local area by burning it the masking material out and a final removal of residual masking material from the local areas is completed by water jet machining or by an ultrasonic cleaning treatment.

18. The method according to claim 17, wherein the local area is a cooling hole and the step of the removal of masking material in cooling holes is done by locating the cooling holes using a vision system which directs a computer numerically controlled machine.

19. The method according to claim 1, wherein the masking material is a photopolymerizing resin or a mixture of resins and photoinitiator which polymerize with exposure to ultraviolet light.

20. The method according to claim 1, wherein the masking material is a UV polymerizing plastic.

21. The method according to of claim 20, wherein thickened masking material containing the filler material is heated or processed so as to volatilize or otherwise remove a volatile not polymerized organic portion of the masking material before the thermochemical or mechanical process on the surface of the component is carried out.

22. The method according to claim 21, wherein the masking material includes binding agents which are effective in holding together solid particles or fibres of the filler material after the organic portion of the masking material is removed.

23. The method according to claim 1, wherein the masking material is thickened by an electromagnetic energy source or a collimated light energy source.

24. The method according to claim 23, wherein the electromagnetic energy source is visible, ultraviolet or infrared light.

25. The method according to claim 23, wherein the collimated light energy source is a laser.

26. The method according to claim 1, wherein the local area to be protected is an area of a gas turbine component which is sensitive to the thermochemical and/or mechanical process.

27. The method according to claim 12, wherein oxide material includes silica, magnesia, calcia, alumina, zirconia, yttria or a mixture thereof.

28. The method according to claim 20, wherein the UV polymerizing plastic is a polyurethane, a polyurethane oligomer mixture, 2-Hydroxyl Methacrylate, Isobornyl Acrylate, Maleic acid, methyl methacrylate, butyl acrylate copolymer, acrylic acid, T-Butyl Perbenzoate, poly(isobutyl methacrylate), poly(vinyl toluene), polyproplyene or a polypropylene/polyurethane oligomer mixture, the class of polymers vetones or silicones, or any mixture thereof.

29. The method according to claim 1, wherein a lowermost layer of the masking material is free of the filler material.

30. A method of protecting a local area of a gas turbine component from the effect of a thermochemical or mechanical processes carried out on a surface of the component, the method comprising the steps of:
  applying a masking material to a local area or to local areas on the gas turbine component in two or more layers, such that the uppermost layer or uppermost layers of the masking material contains the highest volume fraction of at least one filler material;
  at least partially thickening at least one of the layers of the masking material before applying the next layer of the masking material;
  carrying out the thermochemical process or a mechanical process, and
  removing a portion of the masking material from the local area or the local areas by burning the masking material and removing the filler material from the local area or the local areas by a separate step.

31. The method according to claim 30, wherein a lowermost layer of the masking material is free of the filler material.

32. A method of protecting a local area of a gas turbine component from the effect of a thermochemical or mechanical processes carried out on a surface of the component, the method comprising the steps of:
  applying a masking material to a local area or to local areas on the gas turbine component in two or more layers, such that the uppermost layer or uppermost layers of the masking material contains the highest volume fraction of at least one filler material;
  at least partially thickening at least one of the layers of the masking material before applying the next layer of the masking material;
  carrying out the thermochemical process or a mechanical process, and removing a portion of the masking material from the local area or the local areas by heating the masking material to volatilize the portion of the masking material and removing the filler material from the local area or the local areas by a separate step.

33. The method according to claim 32, wherein at least a lowermost layer of the masking material is free of the filler material.

* * * * *